US 8,782,051 B2

(12) United States Patent
Chashchin et al.

(10) Patent No.: US 8,782,051 B2
(45) Date of Patent: Jul. 15, 2014

(54) SYSTEM AND METHOD FOR TEXT CATEGORIZATION BASED ON ONTOLOGIES

(71) Applicants: Kirill Chashchin, Moscow (RU); Sergey Anshukov, Moscow (RU); Valery Bardin, Moscow (RU); Simon Kordonsky, Moscow (RU)

(72) Inventors: Kirill Chashchin, Moscow (RU); Sergey Anshukov, Moscow (RU); Valery Bardin, Moscow (RU); Simon Kordonsky, Moscow (RU)

(73) Assignee: South Eastern Publishers Inc., New York, NY (US)

( * ) Notice: Subject to any disclaimer, the term of this patent is extended or adjusted under 35 U.S.C. 154(b) by 0 days.

(21) Appl. No.: 13/872,022

(22) Filed: Apr. 26, 2013

(65) Prior Publication Data
US 2013/0212111 A1    Aug. 15, 2013

Related U.S. Application Data

(63) Continuation of application No. 13/762,180, filed on Feb. 7, 2013.

(60) Provisional application No. 61/595,709, filed on Feb. 7, 2012.

(51) Int. Cl.
*G06F 17/30* (2006.01)
*G06F 17/27* (2006.01)

(52) U.S. Cl.
CPC .................................. *G06F 17/277* (2013.01)
USPC ........................................................ 707/740

(58) Field of Classification Search
CPC . G06F 17/277; G06F 17/2775; G06F 17/278; G06F 17/2785; G06F 17/279
See application file for complete search history.

(56) References Cited

U.S. PATENT DOCUMENTS

| | | | |
|---|---|---|---|
| 7,546,278 B2 | 6/2009 | Yang et al. | |
| 8,086,616 B1 * | 12/2011 | Bissacco et al. | 707/758 |
| 8,126,890 B2 * | 2/2012 | Bobick et al. | 707/736 |
| 8,359,191 B2 * | 1/2013 | Chen et al. | 704/9 |
| 2003/0061213 A1 * | 3/2003 | Yu et al. | 707/7 |
| 2003/0208488 A1 * | 11/2003 | Perrizo | 707/6 |
| 2003/0217052 A1 * | 11/2003 | Rubenczyk et al. | 707/3 |
| 2006/0052945 A1 * | 3/2006 | Rabinowitz et al. | 702/20 |
| 2006/0053175 A1 * | 3/2006 | Gardner et al. | 707/203 |
| 2007/0271286 A1 * | 11/2007 | Purang et al. | 707/101 |
| 2007/0288247 A1 * | 12/2007 | Mackay | 705/1 |
| 2008/0005094 A1 | 1/2008 | Cunnane et al. | |
| 2008/0275694 A1 * | 11/2008 | Varone | 704/9 |
| 2009/0254572 A1 * | 10/2009 | Redlich et al. | 707/10 |
| 2010/0063799 A1 * | 3/2010 | Jamieson | 704/9 |

(Continued)

*Primary Examiner* — Jacob F Bétit
*Assistant Examiner* — Tyler Torgrimson
(74) *Attorney, Agent, or Firm* — Galvin Patent Law LLC; Brian R. Galvin

(57) ABSTRACT

A system for text categorization based on ontologies comprising data collector software modules; a categorizer software module; and a database comprising an indexed database of documents and their categorizations, and further comprising a plurality of ontologies, each ontology comprising a plurality of hierarchical taxonomies and each hierarchical taxonomy comprising a plurality of taxons. The data collector software modules receive a document to be classified and submit them to the categorizer software module; and the categorizer performs the following steps to categorize each document: splitting the document into sentences; selecting words or phrases that are present in ontologies stored in the database server; selecting a plurality of subtrees from the ontologies based on the presence of specific subcategories in the document; determining a weight for each subcategory; pruning subcategories having a weight below a threshold; and for each of the plurality of modified subtrees, computing a conditionality coefficient.

2 Claims, 7 Drawing Sheets

(56) References Cited

U.S. PATENT DOCUMENTS

2010/0121630 A1* 5/2010 Mende et al. .................. 704/7
2010/0312769 A1* 12/2010 Bailey et al. ................. 707/740
2011/0173189 A1* 7/2011 Singh et al. .................. 707/722
2011/0320454 A1* 12/2011 Hill et al. ..................... 707/739
2012/0158633 A1* 6/2012 Eder .............................. 706/46
2012/0191716 A1* 7/2012 Omoigui ...................... 707/740
2012/0254188 A1* 10/2012 Koperski et al. ............. 707/740
2013/0232147 A1* 9/2013 Mehra et al. ................. 707/737

* cited by examiner

SYSTEM AND METHOD FOR TEXT CATEGORIZATION BASED ON ONTOLOGIES

CROSS-REFERENCE TO RELATED APPLICATIONS

This application is a continuation of U.S. patent application Ser. No. 13/762,180, filed on Feb. 7, 2013, titled "SYSTEM AND METHOD FOR TEXT CATEGORIZATION BASED ON ONTOLOGIES", which claims priority to U.S. provisional patent application Ser. No. 61/595,709, titled "METHOD, PROGRAM PRODUCT, AND SYSTEM OF TEXT POSITIONING OR CATEGORIZATION BASED ON MULTIPLE ONTOLOGIES," which was filed on Feb. 7, 2012. The disclosure of each of the above-referenced patent applications is hereby incorporated by reference in its entirety.

BACKGROUND

The invention relates generally to the field of data processing, and more specifically to the field of object identification based on textual or other descriptions.

BACKGROUND OF THE INVENTION

Taxonomies are considered an acceptable method of object classification. In addition to being able to name classes of objects, taxonomies allow for determination or measurement of the degree of similarity between different objects.

In the simplest form, a taxonomy is a hierarchical grouping of similar concepts into groups signifying more general classes. Two concepts in a taxonomy have similar qualities of the level of a taxonomy that includes both of them, while the degree of their likeness depends on the mutual location of objects within the hierarchy. Classification with the use of taxonomies could be more complicated. For example, some objects could belong to more than one "parent" class (a class located higher in the hierarchy).

Taxonomies may change over time: new groups could be added and the content of the old taxonomy groups could change. Additionally, even with the unchanged taxonomy, classification of a particular object could change if new knowledge about this object appears. There could also be conflicting user opinions on the particular place in the taxonomy for particular objects. These changes may be witnessed (for example) in the field of zoological classification of animals wherein species are frequently reorganized and reclassified as more information is discovered or popular scientific opinion regarding their classification changes, or in the field of astronomy wherein celestial objects are often reclassified according to similar changes in the field.

There exists in the art a method of "object identification by its description" (Russian patent application number 2167450, MPK G 06 F 17/30, published Dec. 27, 2000) that uses a solely statistical measure of similarity based on the frequency of word usage in the document. Because of limitations of statistical methods the problems of polysemy and synonymy remain unsolved in input texts, which essentially decreases the quality of identification compared to the present invention.

There also exists a method of Latent Semantic Indexing (LSI) that can be used for the purposes of documents similarity definition (U.S. Pat. No. 4,839,853, titled "Computer information retrieval using latent semantic structure," by S. Deerwester et al., International classification G06F17/21; G06F17/30; G06F15/40). The LSI method uses statistical methods of text processing, where information about the frequency of words and phrase usage is extracted from numerous texts. Words and phrases become a base for extracting information about "concepts" using statistical methods, which provides an opportunity for further definition of documents' "similarity." Moreover, in contrast to the present invention, LSI method does not use taxonomies as the basis for calculating the similarity, but relies only on statistical methods. For example, the weight of a term is inversely proportional to its frequency in the text regardless of the theme of the document. LSI method does not position documents within a knowledge domain.

There exists another method for document search incorporating the use of taxonomies—U.S. Pat. No. 6,442,545, titled "Term-Level Text with Mining with Taxonomies," by R. Feldman et al., international classification G06F17/30, which does not provide the possibility for one category to be part of different taxonomies, for taxonomies to combine into ontologies, or for the use of the term "conditional coefficient" for ontologies.

There are two known methods that consider the similarity of document pairs in accordance with a given taxonomy: method of taxonomy generation, described in the U.S. Pat. No. 6,360,227, titled "System and Method for Generating Taxonomies with Applications to Content-Based Recommendations", by Ch. Aggarwal, international classification G06F17/30; and a method for generating categorized document bases, described in U.S. patent application publication 2007/0106662, titled "Categorized document bases," by S. Kimbrough et al. In contrast to the present invention these methods do not solve the problem of the documents positioning within the knowledge domain and may be applied solely to the search of similar documents.

Also relevant to the present invention is U.S. patent application publication 2008/0027929 "Computer-Based Method for Finding Similar Objects Using a Taxonomy" by J. Rice et al., which defines ways of turning this intuitive idea of similarity into a numeric value that can be used to rank the similarity of objects.

While solving the task of finding "similar" documents or objects, existing methods do not solve the task of interpretation of search results. For example, we can measure the exact distance between geographical objects, while getting no information on the absolute location of those objects on the Earth's surface.

A further problem of the prior art is that, generally, classification systems start with a single "best map of concepts" and then uses this map to train one or more classifiers. That is, a single taxonomy of concepts is derived from a single corpus such as an online encyclopedia or word net, and then classifiers are trained against that taxonomy. For example, Gabrilovich, et al., U.S. Pat. No. 8,108,204, describes a method of classifying documents by using Wikipedia (an online encyclopedia) as a source for generating a large number of feature vectors that can then be used to classify documents submitted for classification. The Gabrilovich patent is a good example of a common technique used in the art prior to the instant invention, in which one uses one set of documents to build a knowledge space map, which is then treated as the only map available (that is, the technique works on the implicit belief that there can be one "right" or "proper" structure of knowledge which can be used to process and analyze documents generally. This is a serious shortcoming in the art, however, as it would be better to work from the assumption that the same facts can commonly be interpreted completely differently depending on the point of view of the interpreting party. What is needed is a tool that works well without using the assumption of a single "ground truth".

For example, classification of a single set of documents about the Kennedy assassination using a knowledge base built from a criminal investigator's standpoint, from a global financial conspiracy theorist's standpoint, and from a UFO follower's standpoint will likely result completely different outputs.

What is needed is a method that solves the problem of positioning documents or objects in a "knowledge space", and particularly one that is not limited to calculating the degree of similarity or distances between objects. What is also needed is such a system that does not require or assume a single "ground truth", but is based on the assumption that there may be many different points of view, and many different taxonomies, that may be beneficially used as document classifiers.

SUMMARY OF THE INVENTION

The present invention offers a method of positioning of objects within a space of common knowledge, which may be represented by multiple ontologies that, in turn, may be represented by taxonomies, which in turn consist of sets of patterns.

Unlike existing analogs, the same pattern could belong to different categories of taxonomies and every category could simultaneously be the top of a particular ontology tree and a subcategory of another ontology tree.

The present invention unifies multiple taxonomies into ontologies with unified rules of interpretation of elements, as well as may impose additional rules and restrictions on a pattern, which is the basic element of the taxonomy. A language commonly known in the art called RDF (Resource Description Framework) could be used for the description of ontologies with further translation into the internal representation of the categorization engine.

The present method differs from Rice's approach in using the concept of an "ontology" as a complex of taxonomies and allowing cases when a taxon is related to one or more taxonomies as well as using the notion of conditional coefficient, attributed to a taxonomy to determine pattern usage in calculating the category's weight.

It should be noted that documents rarely happen to be on the same topic. Thus, as a rule, a document is positioned within the knowledge domain by not one, but several vectors, each of which can be assigned a weight coefficient.

As it has been mentioned in the aforementioned work of S. Kordonksy, the position of an observer defines the level of significance of certain aspects of the document and makes an attempt of defining the only correct, "main" theme of a document meaningless.

Admitted that real texts do not have an "only right" and comprehensive ontology, it becomes evident that there is a need to build a mechanism of positioning oriented toward obtaining multiple results, which leaves the possibility of choosing a category that is the most relevant for a user at the moment. In contrast to the current invention, none of the aforementioned analogies consider such a problem.

Objects that contain a complex of the above-mentioned features are not known to the current state-of-the-art. This lets us consider the present method to be a novelty.

A set of features different from the ones of the above-mentioned closest analogy is also not known. This suggests that the claimed method has an inventive step to it.

Thus, creating a mechanism of positioning with numerous ontologies that each has a set of taxonomies seems to be an actual technical result in creating an actual functioning system.

An important aspect of the invention is the method of document positioning in the knowledge domain represented by numerous ontologies (each of which may be derived based on a different point of view, or may assume a different "ground truth"), which in turn include a set of taxonomies represented by patterns (see FIG. 5). In contrast to its closest analogy (Rice), taxons are used as a generalization of terms and can describe not only sets of relative terms, but also phrases and expressions that are considered as characteristics of respective categories. The same way as in the analogous method, in the present methods the same pattern can be part of different categories. In contrast to the closest analogy, in this method each category can be simultaneously the peak of one tree and a subcategory of other trees.

In contrast to all the aforementioned methods, taxonomies in this method constitute ontologies with certain rules of taxons interpretation, while additional conditions of use can be applied to patterns. For example, conditional pattern "financial crisis" may be part of a tree subcategory, higher nodes of which may be labeled as "Russia", "Germany", "USA", but in each of the three taxons it will be considered only with the presence of other patterns, clearly belonging to that tree.

According to a preferred embodiment of the invention, a system for text categorization based on ontologies is disclosed. According to the embodiment, the system comprises: a plurality of data collector software modules stored and operating on a plurality of network-attached computers; a categorizer software module stored and operating on a network-attached server computer; and a database server comprising an indexed database of documents and their categorizations, and further comprising a plurality of ontologies, each ontology comprising a plurality of hierarchical taxonomies and each hierarchical taxonomy comprising a plurality of taxons. According to the embodiment, the data collector software modules receive a document to be classified and submit them to the categorizer software module; and the categorizer performs the following steps to categorize each document: splitting the document into sentences; selecting words or phrases that are present in one or more the plurality of ontologies stored in the database server; selecting a plurality of subtrees from the plurality of ontologies based on the presence one or more of a set of specific subcategories in the document; determining a weight for each subcategory within the set of specific subcategories; creating a plurality of modified subtrees by pruning subcategories having a weight below a threshold from each of the selected plurality of subtrees; and for each of the plurality of modified subtrees, computing a conditionality coefficient.

According to another preferred embodiment of the invention, a method for text categorization based on ontologies, the method comprising the steps of: (a) receiving, via a plurality of data collector software modules stored and operating on a plurality of network-attached computers, a document to be classified; (b) submitting the received document to a categorizer software module stored and operating on a network-attached server computer; (c) performing the following using the categorizer software module: (c1) splitting the document into sentences; (c2) selecting words or phrases that are present in one or more the plurality of ontologies stored in the database server; (c3) selecting a plurality of subtrees from the plurality of ontologies based on the presence one or more of a set of specific subcategories in the document; (c4) determining a weight for each subcategory within the set of specific subcategories; (c5) creating a plurality of modified subtrees by pruning subcategories having a weight below a threshold from each of the selected plurality of subtrees; and (c6) for each of the plurality of modified subtrees, computing a conditionality coefficient; and (d) storing a resulting document categorization in a database server comprising an indexed database of documents and their categorizations, and further comprising a plurality of ontologies, each ontology comprising a plurality of hierarchical taxonomies and each hierarchical taxonomy comprising a plurality of taxons.

DETAILED DESCRIPTION

Figure 1:
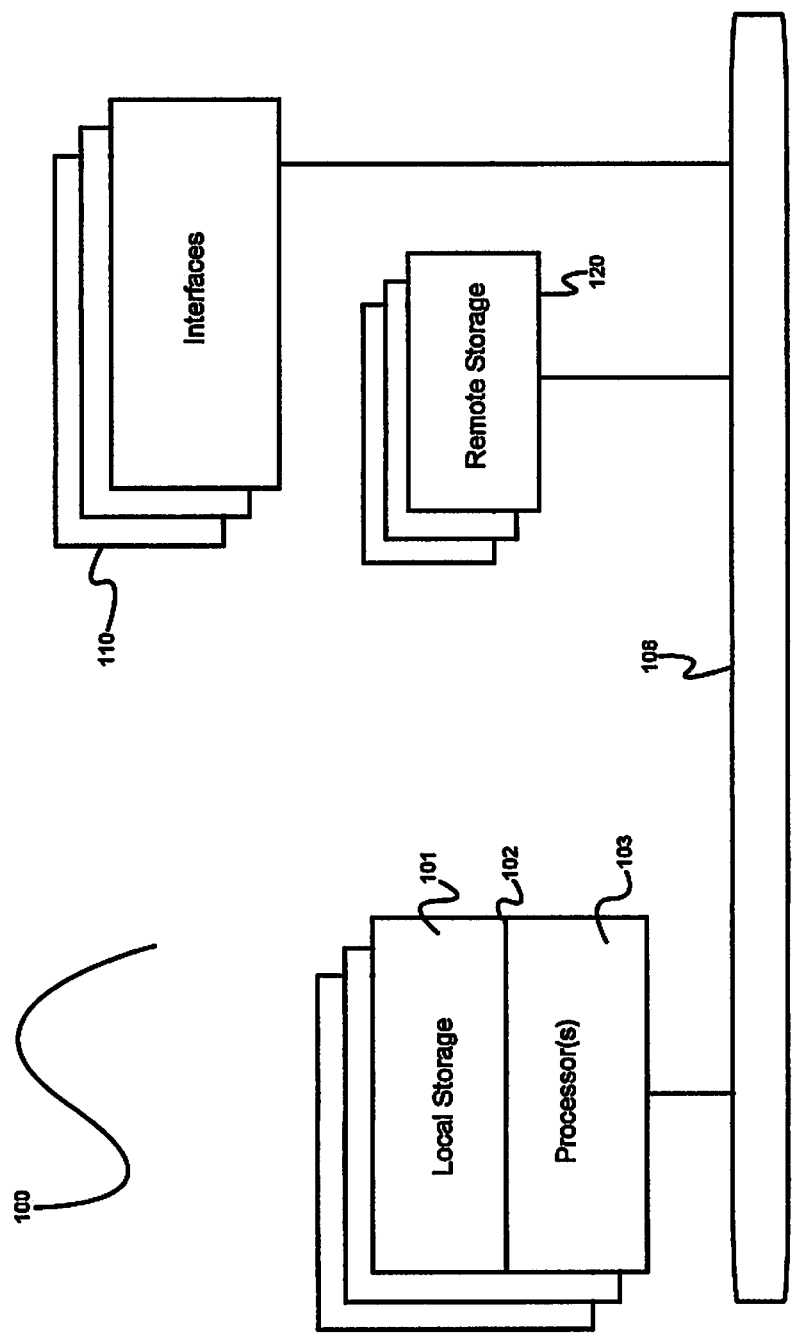
FIG. 1 is a block diagram illustrating an exemplary hardware architecture of a computing device used in an embodiment of the invention.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

A "pattern", as used herein, refers to any verbal, graphic, numeric or other components within the acceptable forms and modifications or phrases that include micro-context as defined below.

"Micro-context", as used herein, refers to any part of a pattern that has its own meaning (for example, a set of symbols is assigned a value of "data", "price", "Name" etc.)

"Directed acyclic graph" (DAG), as used herein, refers to a directed graph with no directed cycles, i.e. ways starting and ending in the same endpoint.

"Taxonomy", as used herein, refers to a DAG (as defined above), which defines a hierarchy or tree of concepts in descending order of categories from most general to most specific. One or more patterns are related to each category.

A "taxon", as used herein, is a graph node of a taxonomy. Any taxon, except for the highest one in a taxonomy, may in turn refer to one or more taxonomies. Similarly, any taxon may be a member (node) of any number of taxonomies.

Figure 4:
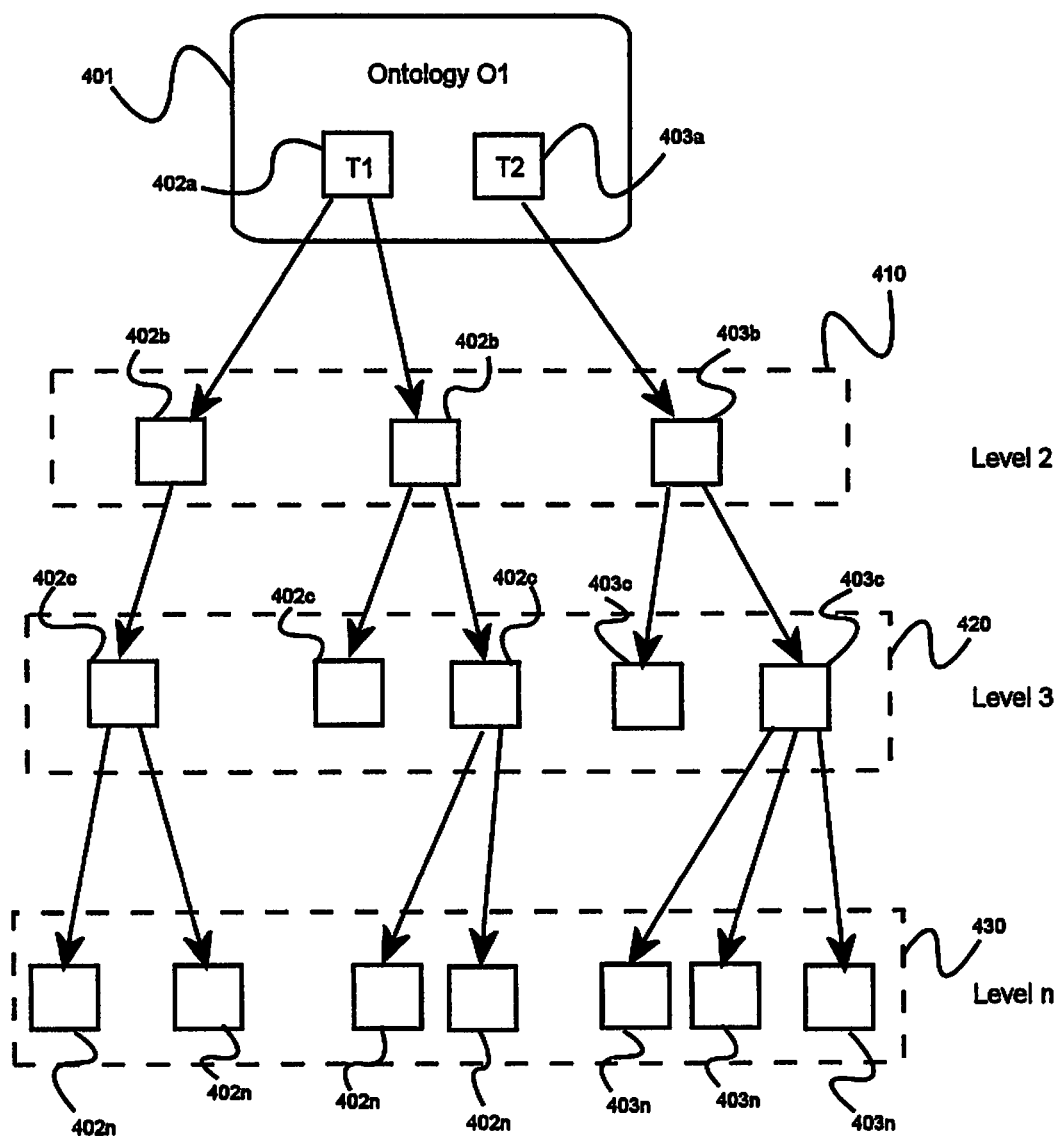
FIG. 4 is block diagram illustrating an exemplary ontology comprising taxonomies presented as directed acyclic graphs.

"Ontology", as used herein, refers to a set of taxonomies, the nature of which allows similar interpretation and can be characterized by the single significance score (see FIG. 4).

"Knowledge domain", as used herein, refers to a set of ontologies describing different subject domains.

"Vector", as used herein, refers to a complex of significant categories sets, to which a current document is related, and each of which may be assigned a weighted value. Each document can be defined by a set of vectors.

"Categorizer", as used herein, refers to a software and hardware mechanism that is intended to obtain description of the input text as a set of vectors, which position the input document in the knowledge domain. Categorizer uses a priori knowledge of the relationship and hierarchy of concepts, typical categories features.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
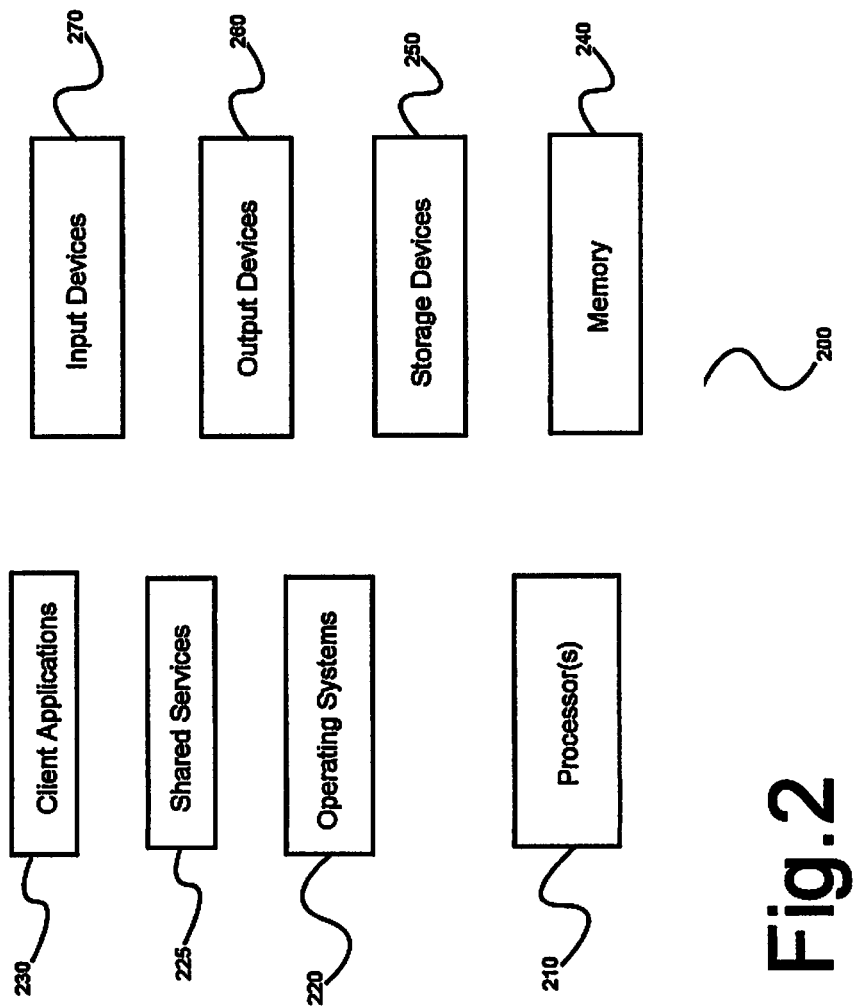
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
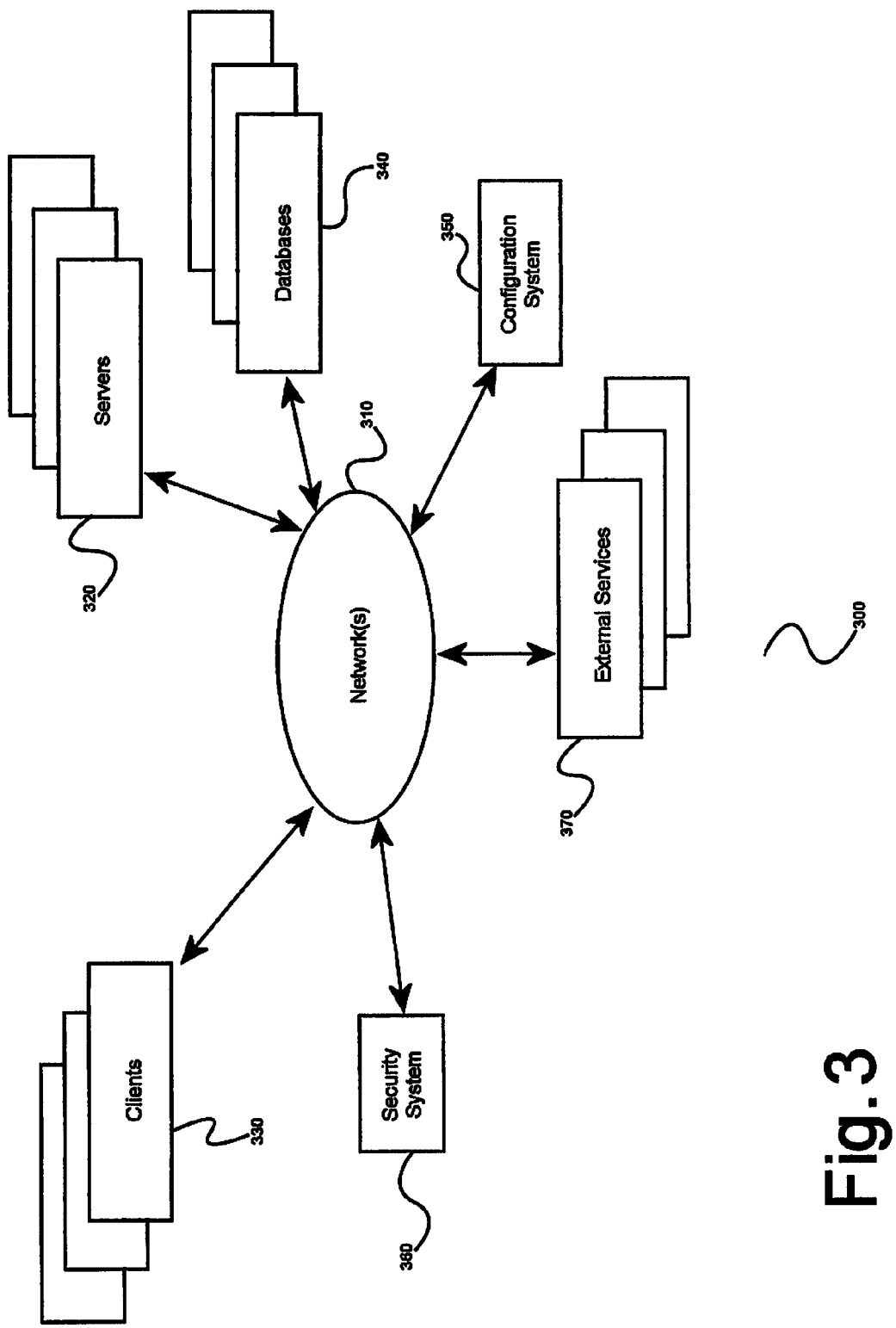
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Conceptual Architecture

FIG. 4 is an illustration of an exemplary embodiment of an ontology 401 comprising a plurality of taxonomies arranged thusly due to their relative likeness or similarity and beginning with root taxons 402a and 403a, each of which taxonomies may comprise (as illustrated) a descending hierarchy or tree of taxons arranged according to their similarity or "likeness", all of which is represented as a DAG as described above. In the illustrated embodiment, ontology 401 contains two taxonomies however it will be appreciated that the specific number of taxonomies may vary and a specific quantity is not a feature of the ontology concept as presented in the invention.

Due to the nature of the presentation of a taxonomy as a directed graph as described previously, within a taxonomy there may be a plurality of additional hierarchies descending relative to the direction of the graph and from most general to most specific. As illustrated, a hierarchy may branch or diversify into additional descending hierarchies at any taxon within a taxonomy, each of which may be considered to be a new taxonomy which exists as a subset of its parent. An example of this concept is illustrated as a taxonomy beginning at root taxon 402a, which then branches into two taxons as the hierarchy is descended. One of these second-tier taxons 402c then branches into additional taxons further descending, and this new hierarchy beginning with a taxon 402c can be considered to be a distinct hierarchical taxonomy existing as a subset of information within the parent taxonomy beginning with taxon 402a. It will be appreciated that any given hierarchy may "branch" or diversify into further descending hierarchies at any particular taxon. Such descending hierarchies may be described using levels as illustrated, representing the relative position of taxons within each hierarchy. For example, as illustrated taxons within level 2 410 of a hierarchy may be subsets or "children" of higher-level taxons 402a, 403a, and may themselves have child taxons which are shown in level 3 420, an organizational scheme which may be expanded and added to accordingly until a final bottom-tier containing taxons which do not have any children or subsets of their own, illustrated as level n 430. It will be appreciated that such a representation is merely for convenience, and that alternate and more complex arrangements of taxons and hierarchies are possible, an embodiment of which is described below in reference to FIG. 5. It will be further appreciated that such an arrangement of taxons may be fluid and subject to change, and that a hierarchy is not rigid or fixed with respect to its content or arrangement and may be readily modified or adapted accordingly when new information is added or existing information is modified.

Within a particular hierarchy a taxon 402b, 403b may be given a superior or higher position relative to other taxons 402c, 403c, or 402n, 403n as determined by their relationships within a hierarchy based on the relative specificity of the information being represented, with more general or broad taxons being positioned higher relative to lower, more specific or narrowly-defined taxons. For example, in a taxonomy representing the classification of animals, a genus might be placed higher relative to a species within a taxonomy, as the species taxon would represent a subset of the genus. It will be appreciated that such an arrangement is exemplary in nature, and that variations and alternatives are possible according to the invention and as appropriate to the subject matter of a taxonomy. It will be further appreciated that the nature of taxonomies is inherently fluid; that is, a taxonomy may not have a rigid structure and is subject to change as new data is added or old data is revised with new information, and that the structure of any particular taxonomy is not a rigid requirement or quality of core concept of a taxonomy, as is being illustrated as a key feature of the present invention.

Figure 5:
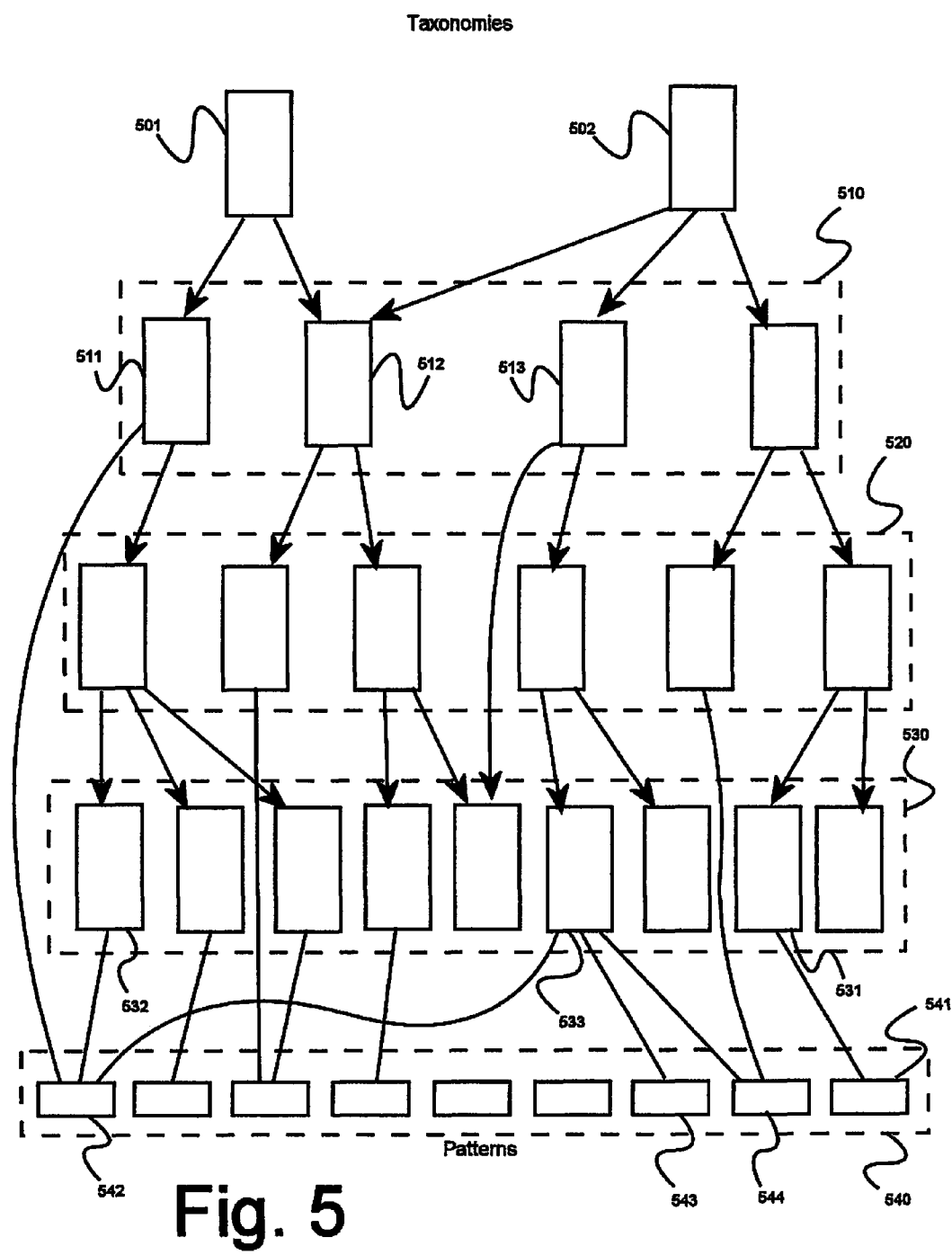
FIG. 5 is a block diagram illustrating an exemplary taxonomy presented as directed acyclic graph with related to taxon patterns.

FIG. 5 is an illustration of an exemplary embodiment of a plurality of taxonomies beginning with parent taxons 501 and 502, illustrating the concept of a DAG which contains more complex hierarchical relationship than those described in FIG. 4, such as taxons with multiple parents which may themselves be taxons of distinct, disparate hierarchies. In this manner, multiple paths may be traced from a single taxon backwards or ascending the hierarchical trees, potentially leading to different parent taxons and ultimately indicating a taxon's placement within a plurality of taxonomies.

As illustrated previously, a taxonomy may begin with a single "head" or "parent" taxon 501 or 502, and then proceed to descend in the direction of the graph into branched hierarchies comprising additional taxons which may be arranged into descending layers or levels 510, 520, or 530 according to their relative likeness or similarity. As illustrated according to the present embodiment, at the bottom-most and most specific level 540 are patterns that represent information contained within taxons. As illustrated, a pattern 541 may be an element of only a single taxon 531 with a direct correlation between the two (i.e., the taxon always contains this pattern and this pattern is always found within the taxon), but it is also possible to have a pattern 542 which is an element of a plurality of taxons 511, 532, and 533. In such an instance, pattern 542 may trace multiple different paths backwards or ascending through the hierarchy, leading to different and potentially unrelated taxons, which in turn may lead to different and potentially unrelated taxonomies as a whole. For example, in the real world a ceramic coffee mug may be represented as an element of the set "beverages", according to its function for holding a beverage in preparation for consumption by a user. Such a mug may also be considered as an element of the set "ceramics" due to its material composition, a set which may have no inherent relationship to dishware (that is, if one were to follow the hierarchy in its descending direction, the taxon for "ceramics" would not necessarily have a direct link to the taxon "beverages", as the two are not inherently related). In this manner, a single pattern may be found to have relevance to a plurality of hierarchies and a wide variety of taxons, which may not be accurately represented by a simpler, 1-to-1 correlative graph as presented in FIG. 4.

As a further example, taxon 501 may be drawn from a taxonomy generated by analyzing a corpus of text relating to criminal investigations, while taxon 502 may be drawn from a taxonomy generated by analyzing a corpus of text relating to politicians. In such a case, and returning to the example used above in the Background section, taxon 512 and its children might represent information relevant to the Kennedy assassination. When classifying a document using the taxonomies shown in FIG. 5, embodiments of the present invention might determine that taxon 512 and one or more of its children were present frequently in the document, and that either taxon 511 and its children or taxon 513 and its children were also present. In such a case, if taxon 511 were present (and not taxon 513), the document would be classified as pertaining to criminal investigations and the Kennedy assassination; conversely, if taxon 513 were present (and not taxon 511), the document would be classified as pertaining to politicians and the Kennedy assassination (all other things being equal). This is important because a document about politicians and their lives, which mentioned the Kennedy assassination, would be misclassified if it were classified as a criminal investigations document, and similarly a document about high-profile criminal investigations that used the Kennedy assassination as a case study would be misclassified if it were labeled as a document principally about politicians. At the same time, if such a document were correctly classified, it might also be classified with the other topic as a secondary topic, according to the present invention, which is helpful because if a criminal investigator were looking for documents about high-profile assassinations, it would be beneficial to have the document in question returned even if its principal classification was as a document about politicians. Since taxon 512 is a child of both taxons 501 and 502 (and could similarly be a child taxon of a UFO conspiracy taxonomy that is not shown), such cross-domain search results are facilitated by the invention.

As further illustrated, it is also possible to have a taxon 533 which comprises a plurality of patterns 542, 543, and 544, and which may themselves be elements of other taxons. In this manner, a single taxon may be shown to represent a plurality of concepts that may or may not have an inherent similarity when considered alone (that is, without considering the parent taxon and only viewing the patterns themselves). Continuing from the above example, the real-world set of "ceramics" may contain the coffee mug as previously described, but may also represent a wide variety of unique and largely unrelated patterns such as medical devices, laboratory equipment, industrial equipment, or military technology. Accordingly, one might not at first glance consider a coffee mug to have any similarity to a ball bearing or armor plate (as described above, viewing the patterns themselves without considering the parent taxons), but when the parent taxon (in this example the categorical concept of "ceramics") is also taken into consideration, the relationship becomes clear. In this manner a far more precise and relevant view of information relationships becomes possible, allowing for a much more effective search of the knowledge domain wherein superficially unrelated concepts may be linked due to their parent taxons and relationships between said parent taxons, continuing backward up the hierarchy. Furthermore, it is possible to combine the two previous examples and have a pattern 433 which is an element of multiple parent taxons, each of which may in turn contain multiple patterns, representing yet more complex relationships between concepts and further improving the precision and relevancy of the taxonomy graph in representing actual information relationship. It will be appreciated that such examples are for illustrative purposes and are not limiting, and that a variety of alternate and combinative arrangement are possible.

DETAILED DESCRIPTION OF EXEMPLARY EMBODIMENTS

Figure 6:
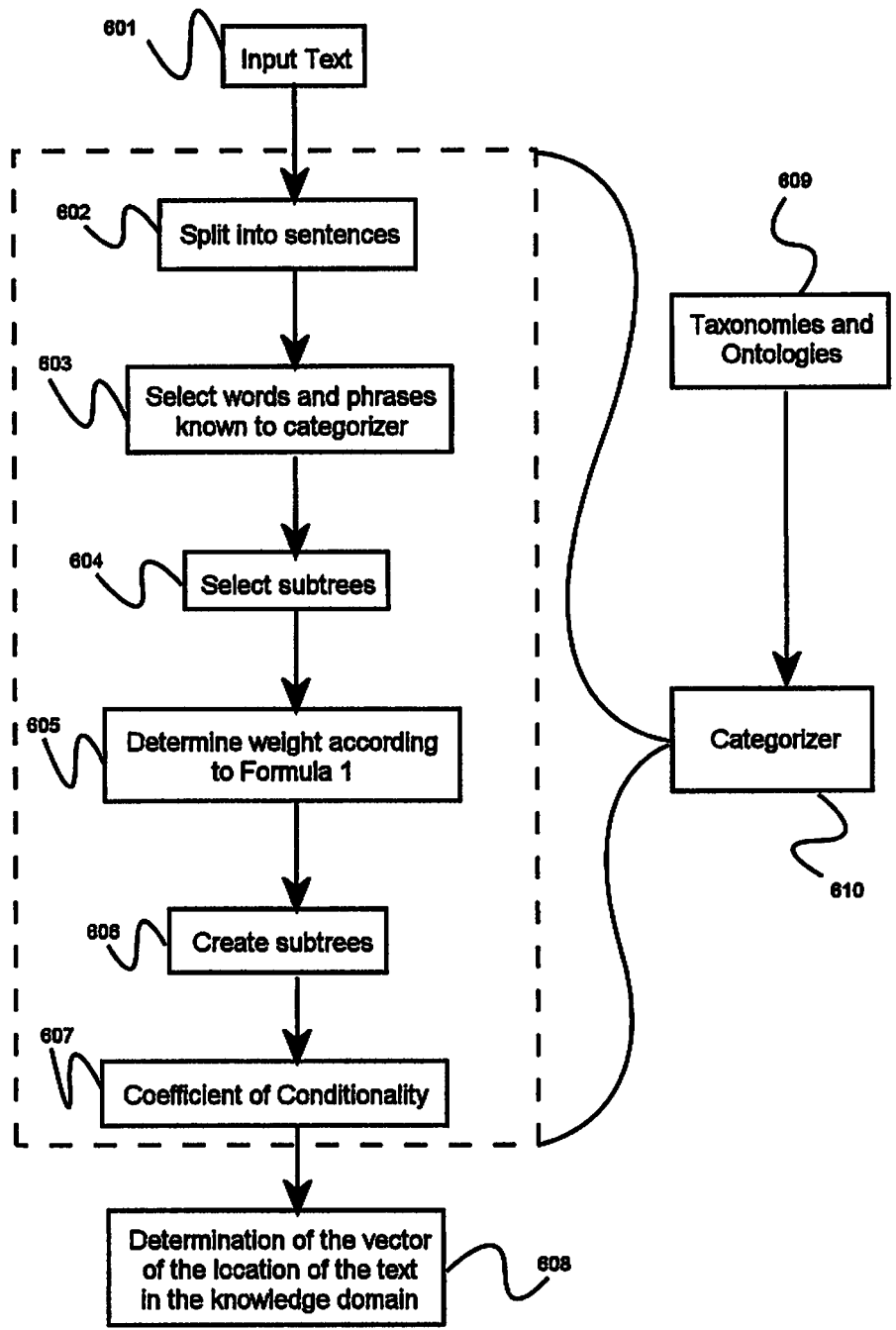
FIG. 6 is a block diagram illustrating an exemplary embodiment of the invention, presenting a method for data processing.

FIG. 6 is an illustration of a preferred embodiment of the invention, illustrating a method for processing input text. Input text 601 is divided into sentences 602. Each sentence is considered for the presence of words and phrases 603, corresponding to the patterns known to categorizer 610. Based on the patterns $\Pi_H$, for which relevant words and phrases are found in the sentence, subtrees (subgraphs) are allocated in the existing taxonomies and ontologies 609, containing concepts corresponding to the given pattern and all its parent concepts. Found patterns $\Pi_H$ confirm the hypothesis of the text belonging to the respective categories. Here we consider not only categories directly confirmed by patterns $\Pi_H$, but also categories including directly confirmed categories. Subtrees consisting of one taxon, leading to one concept, are discarded.

Next, in each of the subtrees the weight of each subcategory 605 is determined. The weight of the category is calculated the following way:

$$w = w_1 + w_2 \qquad (1)$$

where $w_1$—sum of the weights of all the concepts that are directly related to this category, $w_2$—weight of all the subtrees that belong to this node, calculated as $$w_2 = w/(c_1/o_1 + n_c^K),$$

where w—sum of the weights of all the patterns $\Pi_H$, constituting the subtree, $c_1$—number of branches in the subtree, $o_1$—number of patterns in the subtree, $n_c$—number of nodes in the subtree.

The weight of pattern always equals $1/n_c^K$, where $n_c$—number of categories, with which this pattern $\Pi_H$ is directly related, K—coefficient, with value ranging from 0.3 to 3.

The set of vectors leading from the higher categories of a taxonomy to the confirmed subcategories ranging in the order of the weights of categories shows the position of a given document within the knowledge domain.

At the same time subtrees 606, associated with common parent category or if it is absent, by its higher confirmed categories that have a weight lower the border of the cut-off for ontology they constitute are discarded, i.e. they are considered as insignificant.

The significance of category in taxonomy depends on ontology and is defined by the number of the cut-off, which is characteristic of the given ontology. According to the gained weight we can determine categories as more or less significant for the given document. At the same time only subcategories belonging to the taxonomies of the same ontology can participate in comparison. For example, considering taxonomies "color" and "means of transportation" that belong to different ontologies, it will be unreasonable when given the input text "red car" to define if it is more "red" or more "car."

Only the categories that have numerical value of the weight, exceeding the cut-off number for this ontology, can be considered significant. For example, the text that contains only fragments corresponding to the patterns "Viktor Yushchenko", "Yulia Tymoshenko", "gas dispute", "negotiations with Russia", may generate hypotheses about the significance of the following taxons: "Government of Ukraine", "international economic relations", "agreement on gas transportation", "beekeeping". The hypothesis that this document contains information about beekeeping (since V. Yushchenko is a famous beekeeper) will be discarded, because it does not have any confirmations of other patterns of the document. In other words, "Viktor Yushchenko" will only be considered in the context of his political activity and not in the context of his hobbies.

Before calculation of the weight coefficients all patterns that do not correspond to the given conditions are excluded from consideration. Thus, for example, if the condition is mandatory confirmation of the presence of a certain amount of patterns confirming that category, then patterns that did not get an indicated number are excluded from consideration. Because various rules may be used to determine which nearby (in the sense of being close in the graph of an ontology, for example by having a common parent node or a common grandparent node), in some embodiments in step 607 a coefficient of conditionality may be computed or assigned. According to these embodiments, the coefficient of conditionality reflects the degree to which nearby tree branches should be considered when computing weight coefficients for a particular branch. Various means may be used to assign coefficients of conditionality, for example manually assigning such coefficients to tree branches (that is, branches of ontologies or taxonomies such as are shown in FIGS. 4-5), or automatically using one or more user-definable rules. Coefficients of conditionality for a given first branch define the treatment to be accorded to nearby branches when computing a weight coefficient for the first branch, and may be assigned for all or a subset of nearby branches (one coefficient being assigned for each pair of the first branch and a nearby branch). As an example, coefficients of conditionality may be assigned integer values according to rules such as the following, where "test node" refers to the node for which the weight coefficient is being computed, and "neighbor node" refers to the nearby node to which a coefficient of conditionality is applied:

0—always take the nearby branch into account fully;

1—only if the immediately neighboring nodes above or below in the knowledge tree are confirmed to be relevant;

3—use only if the neighbor node is already confirmed to be relevant;

4—use only if there are coefficients equal to 3 from the same branch (neighbor node) anywhere within 3 sentences of the test node in the analyzed text;

6—do not consider the diagnostics in the neighbor node; and

8—do not consider the neighbor node if diagnostics are present.

With the rules presented in the previous example in mind, an example can be illustrated. The diagnostics from a node with the coefficient of conditionality of 4 works (is used) only if there is another diagnostics from the same branch with a coefficient of conditionality of 3.

Thus, for example, identically-spelled patterns may have different specific attributes (typically, for example, the name of one of parent categories), indicating boundaries of a conditional coefficient 607. This allows indicating different conditional values for identically-spelled patterns. Thus, for example, a change in the condition of pattern "шина" ("tire") will not affect the conditional meaning of "шина" ("brace"), if a coefficient of conditionality of 6 or 8 is assigned to the pair. With the help of coeffieients of conditionality, conditional patterns may be described using properties that by themselves do not define object or event exactly, but can belong to different classes of objects or events allowing selecting the needed object in certain circumstances. For example, pattern corresponding to the meaning of "one bed" or "two beds" does not by itself indicates that the document is about a hotel or a train or a ship, but in combination with the patterns that define the theme of "automobile transportation" allows to draw a conclusion that the document is not about all kind of automobiles, but about trailers.

As a result for the input text a set of vectors is defined in step 608 showing the categories that define context of this document, which is considered a position of this text in the knowledge domain.

Documents can be considered similar if they have similar vectors ("documents about the same thing"); a document whose vectors are included as a subset into the set of vectors of the other document (article about plane PO-2 can be included as a subset into a more general document "history of USSR aviation.")

All the above actions are performed using the well-known program operations—comparison, counting reps, calculation of aggregate values, working with matrices, etc. The specific form of the respective programs will be determined by the specific type of hardware and the installed operating system and it is not the subject of the patent claims of the applicants.

Thus, it is seen from the given description that the offered invention allows identifying (position in the knowledge domain) different objects based on their commonality.

The present invention can be used in different areas of information technologies, for example, in the information search, situation evaluation, contextual advertising as well as being the basis for building search engines, which in contrast to traditional search model include traditional search model along with "search by concepts", i.e. search based on documents positioning in the knowledge domain. For example, in terms of traditional search model results of "crisis in Russia" will contain all the documents that contain the entered keywords, while using the search algorithm in the knowledge domain results of the search will be relevant to the semantic content of the search. Another example is that keywords "mass disobedience in Dalnegorsk" relates to <<crisis in Russia>>, but using the traditional search model this result will not be shown, because words "crisis" and "Russia" are not directly mentioned in the document about "mass disobedience in Dalnegorsk."

In addition, the presented algorithm can be used as a means of comparing documents in contextual advertising; behavioral advertising (the presence of the knowledge domain allows introducing the concept of "customer behavior" as the history of his navigation among the documents that are positioned in this domain, or as the history of his navigations among the documents corresponding to the categories of the domain), when binding relevant documents to the document, i.e. documents that have the same set of vectors in the knowledge domain.

The use of the present invention provides a technical result that consists in the increase of the financial efficiency of contextual advertising by increasing the relevance of the demonstrated ads; increase the effectiveness of information retrieval systems efficiency due to more accurate, relevant and pertinent retrieval of the results; improvement of the search engines functioning due to more precise targeting of information and advertising.

Figure 7:
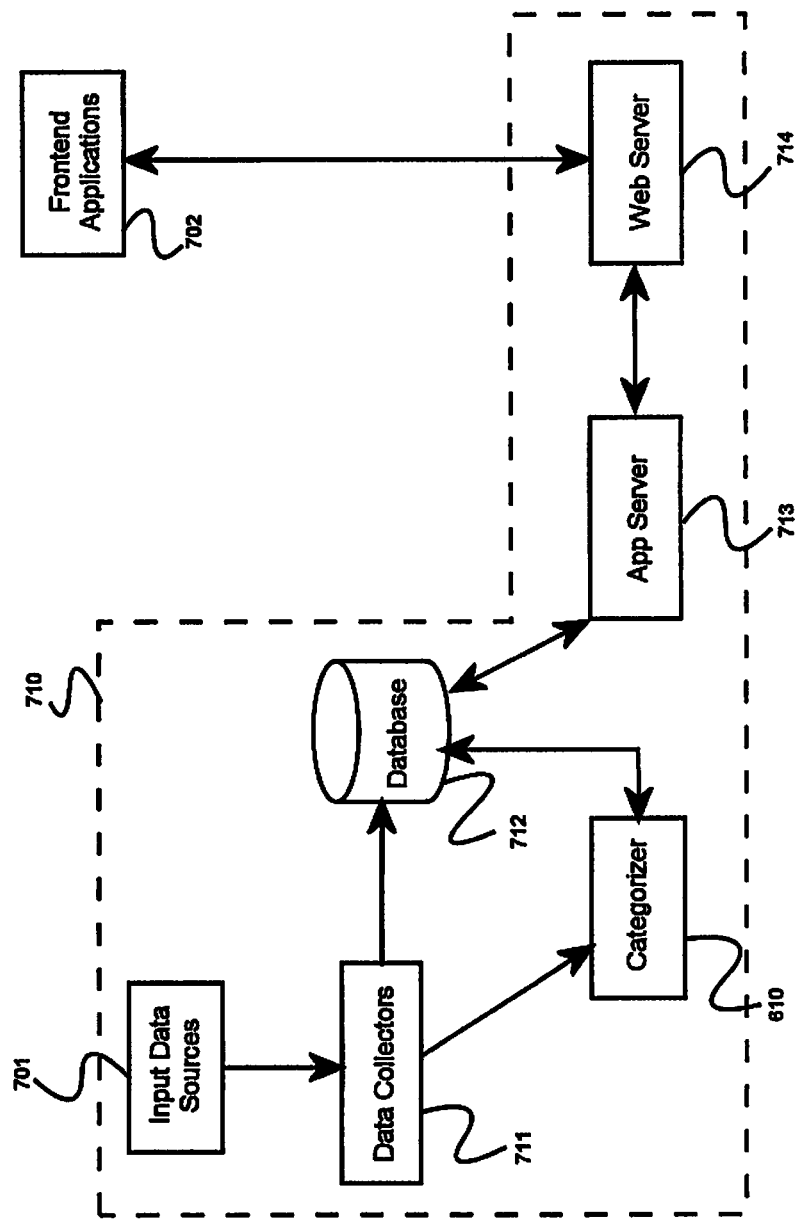
FIG. 7 is a block diagram illustrating an exemplary embodiment of the invention, presenting a system for handling a method of data processing.

FIG. 7 is an illustration of an exemplary embodiment of the invention, comprising a system for data processing 710 that utilizes a categorizer 610 and that can carry out the method for data processing described above (with reference to FIG. 6). According to the embodiment, system 710 may comprise a categorizer 610 as described previously, one or more data collectors 711, one or more databases 712, an application server 713, and a web server 714. It will be appreciated by one having skill in the art that such an arrangement is exemplary and that alternate arrangements are possible enabling alternate configurations of elements with varied functionality, such as a direct interface for users to interact with database 712.

Input data from a plurality of sources 701 may be collected by data collectors 711 for storage in database 712 and processing by categorizer 610 according to the method described previously (referring now to FIG. 6). Sources may include (but are not limited to) online documents and images found on a network such as the Internet or other information-sharing medium, physical documents or images which may be scanned for collection, or manually-entered information. This information may be aggregated by various content collectors 711, which may present aggregated data to categorizer 610 for processing and storage in a database 712, or it may be stored directly in database 712 for later processing by categorizer 610. Database 712 may be a physical data store or a cloud-based, networked storage medium as is common in the art, and a plurality of linked or separate data stores may be implemented as appropriate for any given infrastructure arrangement according to the invention. It will be appreciated that the specific arrangement and construction of elements illustrated is exemplary, and that many alternate arrangement and variations are possible and become possible as technology progresses.

As described previously with reference to FIG. 6, a categorizer 610 may interact with data aggregated in a database 712 and process it according to the method of the present invention, such as might be appropriate if a user alters the categorizer algorithm or updates data stored in a database 712. In such a manner, the relationship between categorizer 610 and database 712 is bi-directional; that is, a categorizer may both store and retrieve data from a database 712 as appropriate according to the operations being performed. Processed information may then be further stored in a database (which may or may not be the same database 712 from which the data was retrieved, and may vary according to the invention), or it may be presented to a variety of frontend applications 702. Exemplary frontend applications may include (but are not limited to) a search engine, a text- or graphically-based user interface to enable a user to interact with stored data, or a variety of connected services which may of interactive or static nature such as advertising engines which may rely on processed data from a categorizer 610. As illustrated, an application server 713 and web server 714 may be implemented to facilitate interaction with a system 701 by other services or human users for various purposes such as interaction with stored data or configuration of categorizer 610. It will be appreciated that such implementations are exemplary in nature, and one skilled in the art will recognize the potential for many variations and alternate embodiments according to the invention which make use of the method and categorizer presented herein, and which may utilize additional or fewer elements than those presented in the embodiment.

The above examples of the present invention are used only as illustrations and in no way limit the scope of the patent claims that are presented below.

While the abovementioned description of the invention enables one of ordinary skill to make and use what the inventors consider presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A system for text categorization based on ontologies, the system comprising:
 a plurality of data collector software modules stored and operating on a plurality of network-attached computers;
 a categorizer software module stored and operating on a network-attached server computer; and
 a database server comprising an indexed database of documents and their categorizations, and further comprising a plurality of ontologies, each ontology comprising a plurality of hierarchical taxonomies and each hierarchical taxonomy comprising a plurality of taxons;
 wherein the data collector software modules receive a text to be classified and submits the received text to the categorizer software module; and
 further wherein the categorizer performs the following steps to categorize the received text:
 splitting the text into sentences;
 selecting words or phrases from the sentences of the received text that are present in one or more of the plurality of ontologies stored in the database server;
 determining one or more specific subcategories that the sentence corresponds to in view of pattern analysis of the selected words or phrases;
 selecting a plurality of subtrees from the plurality of ontologies based on the determination of the selected words or phrases belonging to one or more specific subcategories;
 determining a weight for each subcategory within the one or more of the specific subcategories;
 using the selected plurality of subtrees to create at least one modified subtree by eliminating from the selected plurality of subtrees subcategories having a category weight below a threshold;
 for each of the at least one modified subtree, computing a conditionality coefficient to make a Boolean determination of whether to consider the respective modified subtree or not in categorization of the text; and
 using any modified subtree that has been determined to be considered in categorization of the text to categorize the text;

wherein the conditionality coefficient is determined at least in part by user-defined rules or the presence, or absence, of diagnostics in nodes of at least one neighboring subtree.

2. A method for text categorization based on ontologies, the method comprising the steps of:

receiving, via a plurality of data collector software modules stored and operating on a plurality of network-attached computers, a text to be classified;

submitting the received text to a categorizer software module stored and operating on a network-attached server computer;

performing the following using the categorizer software module: splitting the text into sentences;

selecting words or phrases from the sentences of the received text that are present in one or more the plurality of ontologies stored in the database server;

determining one or more specific subcategories that the sentence corresponds to in view of pattern analysis of the selected words or phrases;

selecting a plurality of subtrees from the plurality of ontologies based on the determination of the selected words or phrases belonging to one or more specific subcategories;

determining a weight for each subcategory within the one or more of the specific subcategories;

using the selected plurality of subtrees to create at least one modified subtree by eliminating from the selected plurality of subtrees subcategories having a category weight below a threshold;

for each of the at least one of modified subtree, computing a conditionality coefficient;

using the conditionality coefficient to make a Boolean determination of whether to consider the respective modified subtree or not in categorization of the text; and using any modified subtree that has been determined to be considered to store a resulting document categorization in a database server comprising an indexed database of texts and each of their respective categorizations, and further comprising a plurality of ontologies, each ontology comprising a plurality of hierarchical taxonomies and each hierarchical taxonomy comprising a plurality of taxons;

wherein the conditionality coefficient is determined at least in part by user-defined rules or the presence, or absence, of diagnostics in nodes of at least one neighboring subtree.

* * * * *